US009282510B2

(12) United States Patent
Narlikar et al.

(10) Patent No.: US 9,282,510 B2
(45) Date of Patent: Mar. 8, 2016

(54) DYNAMIC REORGANIZATION OF CELL STRUCTURES IN WIRELESS NETWORKS (75) Inventors: Girija Narlikar, Mumbai (IN); Satish Kanugovi, Bangalore (IN); Subhendu Chattopadhyay, Bangalore (IN); Sourjya Bhaumik, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 120 days.

(21) Appl. No.: 13/697,622

(22) PCT Filed: Mar. 1, 2011

(86) PCT No.: PCT/IB2011/000783
§ 371 (c)(1),
(2), (4) Date: Jan. 25, 2013

(87) PCT Pub. No.: WO2011/151684
PCT Pub. Date: Dec. 8, 2011

(65) Prior Publication Data
US 2013/0137446 A1    May 30, 2013

(30) Foreign Application Priority Data
May 13, 2010 (IN) ........................... 1352/CHE/2010

(51) Int. Cl.
H04W 72/00 (2009.01)
H04W 52/02 (2009.01)
H04W 16/08 (2009.01)
(Continued)

(52) U.S. Cl.
CPC .......... *H04W 52/0206* (2013.01); *H04W 16/08* (2013.01); *H04W 52/0203* (2013.01); *H04W 16/18* (2013.01); *H04W 16/32* (2013.01); *H04W 88/08* (2013.01); *Y02B 60/50* (2013.01)

(58) Field of Classification Search
CPC . H04W 16/08; H04W 52/02; H04W 52/0203; H04W 52/0206
USPC ................... 455/452.1, 435.1, 436, 438, 443; 370/311, 331
See application file for complete search history.

(56) References Cited

U.S. PATENT DOCUMENTS

2009/0129341 A1* 5/2009 Balasubramanian et al. 370/331
2010/0167728 A1* 7/2010 Venkitaraman et al. ...... 455/434
2010/0329132 A1* 12/2010 Raghothaman et al. ...... 370/252

FOREIGN PATENT DOCUMENTS

GB    2 378 853 A    2/2003
WO    WO 2009/031956 A1    3/2009
WO    WO 2009127276 A1 * 10/2009
WO    WO 2010/002991 A1    1/2010

OTHER PUBLICATIONS

L. Chiaravaglio et al., "Energy Aware UMTS Access Networks," The 11th International Symposium on Wireless Personal Multimedia Communications, XP007913001, 5 pages, Jan. 1, 2008.
(Continued)

*Primary Examiner* — Barry Taylor
(74) *Attorney, Agent, or Firm* — Fay Sharpe LLP (57) ABSTRACT Dynamic reorganization of cell structures in wireless networks. The present invention relates to wireless communications and, more particularly, to energy usage of wireless equipments in wireless communications. Currently there are mechanisms in use that can selectively turn of carriers in a BTS depending on the traffic load. But due to the fixed costs of operating the base station even when there are no active users, turning off entire BTS will give more energy savings than simply reducing capacity by turning off carriers at low load. Embodiments herein detect a change in demand on the network and re-organize the cellular network by selectively turning off BTSs and appropriately increasing the coverage area of other BTSs, and arrive at a configuration that optimizes the energy consumption of the cellular network as a whole.

9 Claims, 6 Drawing Sheets (51) Int. Cl.
　　*H04W 16/18*　　(2009.01)
　　*H04W 16/32*　　(2009.01)
　　*H04W 88/08*　　(2009.01)

(56) References Cited

OTHER PUBLICATIONS

"3rd Generation Partnership Project; Technical Specification Group Services and System Aspects; Telecommunication management; Study on Energy Savings Management (ESM); (Release 10)," 3GPP TR 32.826 V10.0.0, XP050402127, pp. 1-33, Mar. 30, 2010.

M. A. Marsan et al., "Optimal Energy Savings in Cellular Access Networks," Communications Workshop, IEEE, XP031515485, pp. 1-5, Jun. 14, 2009.

Alcatel-Lucent, "Capacity and coverage SON Use case," 3GPP TSG RAM3#59, R3-080082, XP050163314, 4 pages, Sorrento, Italy, Feb. 11-15, 2008.

Motorola et al., "A method to support femto-macro handover with minimal interference to the macro network," ip.com Journal, XP013126575, 4 pages, Oct. 16, 2008.

International Search Report for PCT/IB2011/000783 dated Aug. 5, 2011.

* cited by examiner

DYNAMIC REORGANIZATION OF CELL STRUCTURES IN WIRELESS NETWORKS

TECHNICAL FIELD

The present invention relates to wireless communications and, more particularly, to energy usage of wireless equipments in wireless communications.

BACKGROUND

Base Transceiver Stations (BTS) provide wireless coverage in a particular area. The BTS may comprise of a plurality of transceivers, which transmit wireless communication signals to a plurality of users and receive wireless communication signals from the plurality of users. The users are present within the coverage area (also known as a cell) of the BTS.

In a wireless communication network with BTS, the BTS consume a large amount of energy; in some cases as high as 90% of the total consumption. The energy consumption of a BTS depends on the BTS hardware, the air interface technology, the size of the coverage area (which is defined in terms of cell radius) and the traffic load on the BTS (in terms of the users and their data rates). The optimal cell size from an energy perspective depends on all of the above factors. There is no fixed cell size that optimizes the overall energy consumption of a cellular network. Smaller cells may be efficient in terms of serving high capacity, but because of the fixed energy cost associated with keeping each BTS operational, they become less energy efficient when the demand is low. The demand for capacity as well as the user demography varies over time.

Currently there are mechanisms in use that can selectively turn off carriers in a BTS depending on the traffic load. Say, for a BTS with 3 carriers, during periods of low user activity when the current number of users and their demands can be met by a single carrier, two of the carriers can be switched off to save energy. But even when there are no active users, there are certain fixed costs involved with keeping the BTSs operational.

SUMMARY

In view of the foregoing, an embodiment herein provides a method of selecting an optimal cell size in a wireless communication network comprising of a planning module, a plurality of base transceiver stations and at least one user, the method comprising steps of the planning module calculating power consumption of the wireless communication network based on architecture of the wireless communication network; the planning module calculating an optimal cell radius, wherein the optimal cell radius depends on at least one of users served by the wireless communication network and minimizes power consumption of the wireless communication network over a period of time; traffic variation over a period of time in the wireless communication network; power consumption of the Base Transceiver Stations; and types of service offered by the wireless communication network; and the planning module calculating a set of cell radii by considering all possible combinations of the optimal cell radius at predefined intervals, wherein the cell radii minimizes power consumption in the wireless communication network. A cell structure is further created in the wireless communication network based on the set of cell radii, wherein the cell structure comprises of at least one umbrella base transceiver station and a plurality of subsidiary base transceiver stations.

Embodiments further disclose a wireless communication network comprising of at least one means adapted for calculating power consumption of the wireless communication network based on architecture of the wireless communication network; calculating an optimal cell radius, where the optimal cell radius minimizes power consumption of the wireless communication network over a period of time, wherein the optimal cell radius depends on at least one of users served by the wireless communication network; traffic variation over a period of time in the wireless communication network; power consumption of the Base Transceiver Stations; and types of service offered by the wireless communication network; and calculating a set of cell radii based on the optimal cell radius by considering all possible combinations of the optimal cell radius at predefined intervals, wherein the cell radii minimizes power consumption in the wireless communication network.

Disclosed herein is a method for re-organizing cells in a wireless communication network, the wireless communication network comprising of a wireless network core, at least one umbrella base transceiver station and a plurality of subsidiary base transceiver stations, the method comprising steps of the umbrella base transceiver station determining that traffic in cell coverage area of the subsidiary base transceiver station has crossed a threshold; the umbrella base transceiver station determining if energy can be saved by re-organizing cells in the wireless communication network; the umbrella base transceiver station instructing the subsidiary base transceiver station to perform a specific action, if energy can be saved by re-organizing cells in the wireless communication network; and the umbrella base transceiver station revising cell coverage area of the umbrella base transceiver station. The umbrella base transceiver station determines that traffic in a cell coverage area of the subsidiary base transceiver station has crossed a threshold by tracking locations of users present in cell coverage area, the umbrella base transceiver station tracking locations of the users using at least one of Global Positioning System; signal strength received from the user(s); and Triangulation. The umbrella base transceiver station instructs the subsidiary base transceiver station to turn ON/OFF. The umbrella base transceiver station reduces cell coverage area if the subsidiary base transceiver station is turned ON. The umbrella base transceiver station increases cell coverage area if the subsidiary base transceiver station is turned OFF.

Also, disclosed herein is a base transceiver station in a wireless communication network, the base transceiver station comprising of at least one means adapted for determining that traffic in cell coverage area of a subsidiary base transceiver station has crossed a threshold, wherein the subsidiary base transceiver station is present in cell coverage area of the base transceiver station; determining if energy can be saved by re-organizing cells in the wireless communication network; instructing the subsidiary base transceiver station to perform a specific action, if energy can be saved by re-organizing cells in the wireless communication network; and revising cell coverage area of the base transceiver station. The base transceiver station is adapted to determine traffic in cell coverage area of the subsidiary base transceiver station using at least one of Global Positioning System; Signal strength received from the user(s); and Triangulation. The base transceiver station is adapted to instruct the subsidiary base transceiver station to turn ON/OFF. The base transceiver station is adapted to reduce cell coverage area if the subsidiary base transceiver station is turned ON. The base transceiver station is adapted to increase cell coverage area if the subsidiary base transceiver station is turned OFF.

Embodiments herein disclose a method for re-organizing cells in a wireless communication network, the wireless communication network comprising of a wireless network core, at least one umbrella base transceiver station and a plurality of subsidiary base transceiver stations, the method comprising steps of the subsidiary base transceiver station informing the wireless network core, if traffic in cell coverage area of the subsidiary base transceiver station has crossed a threshold by monitoring received reverse link signal strength; the wireless network core determining if energy can be saved by re-organizing cells in the wireless communication network; the wireless network core instructing the subsidiary base transceiver station to perform a specific action, if energy can be saved by re-organizing cells in the wireless communication network; and the umbrella base transceiver station revising cell coverage area of the umbrella base transceiver station. The subsidiary base transceiver station determines that traffic in cell coverage area of the subsidiary base transceiver station has crossed a threshold by monitoring received reverse link signal strength, wherein the umbrella base transceiver station informs the subsidiary base transceiver station of reverse link channels to be monitored for the received reverse link signal strength. The wireless network core instructs the subsidiary base transceiver station to turn ON/OFF. The umbrella base transceiver station reduces cell coverage area if the subsidiary base transceiver station is turned ON. The umbrella base transceiver station increases cell coverage area if the subsidiary base transceiver station is turned OFF.

Embodiments herein also disclose a base transceiver station in a wireless network capable of re-organizing cells in a wireless communication network, the base transceiver station comprising at least one means adapted for informing a wireless network core, if traffic in cell coverage area of the base transceiver station has crossed a threshold by monitoring received reverse link signal strength; and performing an action as indicated by the wireless network core if the wireless network core detects that energy can be saved by re-organizing cells in the wireless communication network. The base transceiver station adapted for determining traffic in cell coverage area of the base transceiver station by monitoring received reverse link signal strength, wherein an umbrella base transceiver station informs the base transceiver station of reverse link channels to be monitored for the received reverse link signal strength. The base transceiver station adapted for turning ON/OFF, on receiving an indication from one of the wireless network core; the umbrella base transceiver station. Also, disclosed herein is a wireless network core in a wireless communication network, the wireless network core comprising at least one means adapted for determining if energy can be saved by re-organizing cells in the wireless communication network, on receiving an indication from a subsidiary base transceiver station; and instructing the subsidiary base transceiver station to perform a specific action, if energy can be saved by re-organizing cells in the wireless communication network. The wireless network core is adapted to instruct the subsidiary base transceiver station to turn ON/OFF.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose detect a change in demand on a wireless network and re-organize the network, by selectively turning off BTSs and appropriately increasing the coverage area of other BTSs, to arrive at a configuration that optimizes the energy consumption of the network. Referring now to the drawings, and more particularly to FIGS. 1 through 4, where similar reference characters denote corresponding features consistently throughout the figures, there are shown embodiments.

Figure 1:
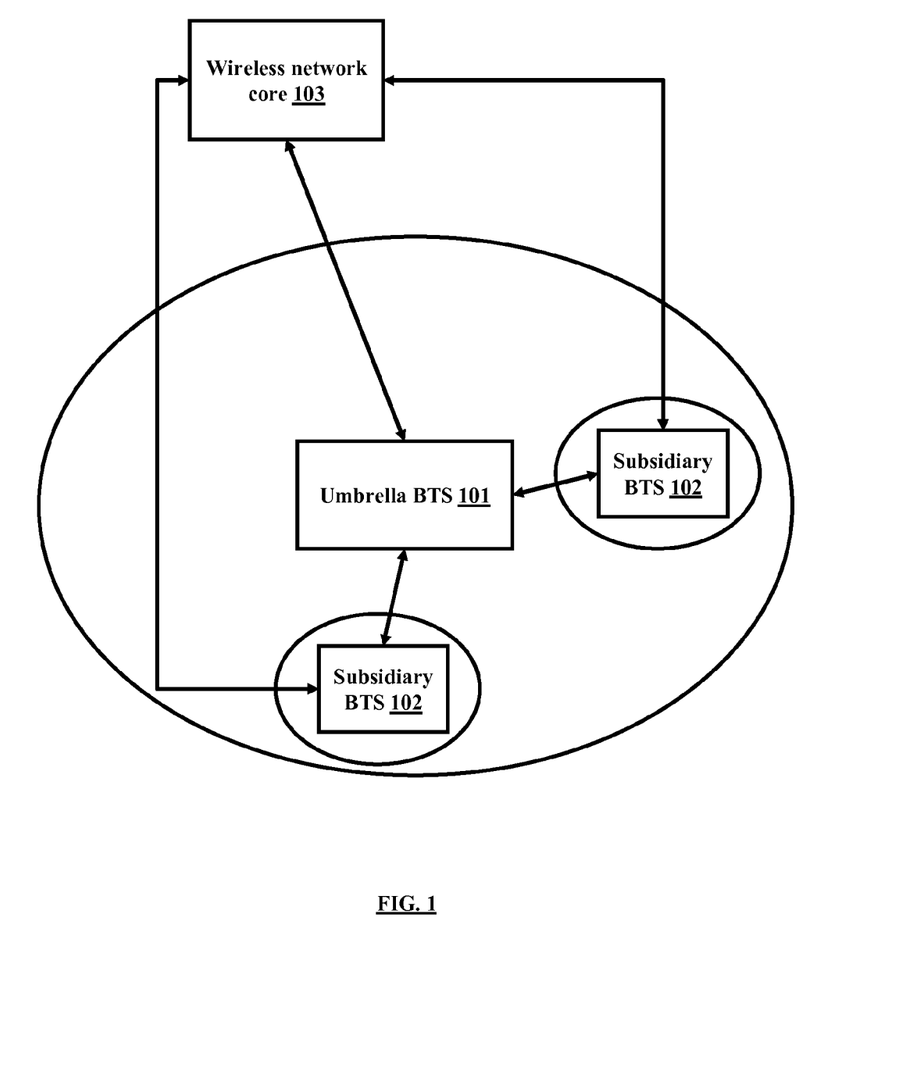
FIG. 1 depicts a wireless network, according to embodiments as disclosed herein.

FIG. 1 depicts a wireless network, according to embodiments as disclosed herein. The depicted network comprises of an umbrella Base Transceiver Station (BTS) 101, at least one subsidiary BTS 102 and a wireless network core 103. The wireless network core 103 is connected to the umbrella BTS 101 and the subsidiary BTSs 102 using a suitable connection means. The wireless network core 103 may belong to a cellular network, a Personal Communications Service (PCS) network or any wireless communication network.

The umbrella BTS 101 and the subsidiary BTSs 102 are BTSs which have been configured to provide coverage to a cell. The umbrella BTS 101 may be connected using a suitable connection means to the subsidiary BTSs 102. The subsidiary BTSs 102 may also be connected to each other using suitable connection means. In another embodiment herein, the subsidiary BTS 102 may be a micro cell, a relay or a remote head.

The wireless network core 103 calculates the power consumption of the wireless network as a function of a plurality of parameters, where the parameters are based on the fundamentals of noisy channel communication, radio signal propagation and cellular base-station architecture. The wireless network core 103 further calculates the optimal cell radius in terms of power consumption, for a particular setting of the parameters like total user population, traffic variation over a period of time, fixed power consumption of BTS, type of service etc. The wireless network core 103 further obtains a set of radii which minimizes power consumption over the same traffic variation by considering all possible combinations of radii at pre-defined intervals. In another embodiment herein, the search-space may be reduced by considering a discreet set of cell radii (e.g. from 100 meters to 2 kms in step of 100 meters results in total 20 radii) and maintaining an order among the candidate radii (lower level radii do not exceed higher level radii).

Based on the calculated optimal cell radii, the network cell structure may be created. The network cell structure may be for a new network or for an existing network cell structure. The network cell structure comprises of at least one umbrella BTS 101 and at least one subsidiary BTS 102. The umbrella BTS 101 may always be ON, while the subsidiary BTS 102 may be ON or OFF, depending on the network traffic.

The decision on if the subsidiary BTS 102 is to be turned ON or OFF may be done by comparing the energy consumption at that instant of time. The energy consumption is measured in terms of overall energy consumed, across all users, when the user(s) in the coverage area of the subsidiary BTS 102 is (are) served by the umbrella BTS 101 and overall energy consumed, across all users, when user(s) in the coverage area of the subsidiary BTS 102 are served by the subsidiary BTS 102 and the coverage area of the umbrella BTS 101 is appropriately changed. In an embodiment herein, if the subsidiary BTS 102 is turned ON/OFF, then the coverage area of more than one umbrella BTS 101 may have to be appropriately changed.

In an embodiment herein, subsidiary BTS 102 to be turned ON/OFF may be pre-defined and may further depend on the traffic pattern in the coverage area.

Figure 2:
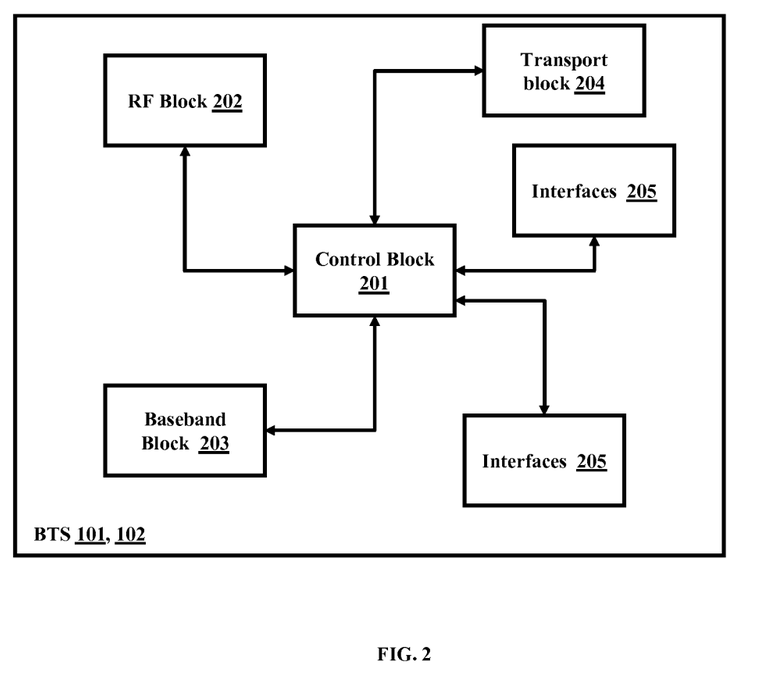
FIG. 2 depicts a BTS, according to embodiments as disclosed herein.

FIG. 2 depicts a Base Transceiver Station (BTS), according to embodiments disclosed herein. The BTS 101, 102 as depicted comprises of a control block 201, a Radio Frequency (RF) block 202, a baseband block 203, a transport block 204, a plurality of interfaces 205 and a traffic detection module 206. The interfaces 205 are transmitters and receivers and are responsible for communicating with the eternal components, where the external components may be users and other network components. The signals received by the interfaces 205 are sent to a RF block 202 for conversion to digital data, which is sent to the baseband block 203. The baseband block 203 processes the encoded signal, coverts it to a baseband signal, before sending the signal using the transport block 204. The transport block 204 communicates with the terrestrial network, where the terrestrial network may be a Public Switched Telephone Network (PSTN) or any other network. The traffic detector module 206 monitors the traffic present within the coverage area of the BTS 101, 102. The control block 201 controls the functioning of all the modules present within the BTS 101, 102.

The traffic detector module 206 detects the current traffic and informs the wireless network core 103 of the current traffic. The traffic detector module 206 may detect the traffic individually. The traffic detector module 206 may also detect the traffic in co-operation with other BTSs. The wireless network core 103 instructs the BTS 101, 102 to perform appropriate actions.

In an embodiment herein, the traffic detector module 206 present in an umbrella BTS 101 tracks the location of the users within the coverage area. The location of the users may be tracked using the signal strength of the users, which may be measured at the umbrella BTS 101, any known access node available to users or a plurality of subsidiary BTSs 102. The location of the users may also be done using triangulation or Global Positioning System (GPS). As the traffic detector module 206 detects that more than a threshold number of users are present within the coverage area of a subsidiary BTS 102, the traffic detector module 206 instructs the control block 201. The control block 201 decides if the subsidiary BTS 102 is to be turned ON or OFF, based on comparing the energy consumption at that instant of time. If the control block 201 decides that the energy consumption may be reduced by turning the subsidiary BTS 102 ON, then the control block 201 informs the subsidiary BTS 102 of the same and turns ON the subsidiary BTS 102. The control block 201 may reduce the cell coverage area of the umbrella BTS 101 accordingly. If the control block 201 decides that the energy consumption may be reduced by turning the subsidiary BTS 102 OFF, then the control block 201 informs the subsidiary BTS 102 of the same and turns OFF the subsidiary BTS 102. The control block 201 may increase the cell coverage area of the umbrella BTS 101 accordingly. If the control block 201 decides that the energy consumption may not be reduced significantly by turning the subsidiary BTS 102 ON/OFF, the control block 201 may not perform any corresponding action.

In another embodiment herein, the receiver present in the RF block 202 of the subsidiary BTS remain ON, while all the other modules are inactive. The receiver tracks the transmissions of the users within in its coverage area. The receiver may track the users using the received reverse link signal strength. As the received reverse link signal strength goes beyond a specified threshold value, the receiver activates the control block 201, which informs the umbrella BTS 101, which in turn informs the wireless network core 103. In another embodiment herein, the receiver activates the control block 201, which informs the wireless network core 103 directly. The wireless network core 103 decides if the subsidiary BTS 102 is to be turned ON or OFF, based on comparing the energy consumption at that instant of time. If the wireless network core 103 decides that the energy consumption may be reduced by turning the subsidiary BTS 102 ON, then the wireless network core 103 informs the umbrella BTS 101 of the same and turns ON the subsidiary BTS 102. The control block 201 may reduce the cell coverage area of the umbrella BTS 101 accordingly. If the wireless network core 103 decides that the energy consumption may be reduced by turning the subsidiary BTS 102 OFF, then the wireless network core 103 informs the umbrella BTS 101 of the same and turns OFF the subsidiary BTS 102. The control block 201 may increase the cell coverage area of the umbrella BTS 101 accordingly. If the wireless network core 103 decides that the energy consumption may not be reduced significantly by turning the subsidiary BTS 102 ON, then the wireless network core 103 informs the umbrella BTS 101 of the same and the control block 201 may not perform any corresponding action.

In another embodiment herein, the umbrella BTS 101 informs the subsidiary BTSs 102 of the reverse link channels to be monitored. The umbrella BTS 101 determines the users present in the vicinity of the subsidiary BTSs and fetches the reverse link channels of these users, which is sent to the respective subsidiary BTS 102.

In another embodiment herein, the subsidiary BTS 102 may inform any other suitable element in the network, which may perform the above consumption calculations.

Figure 3:
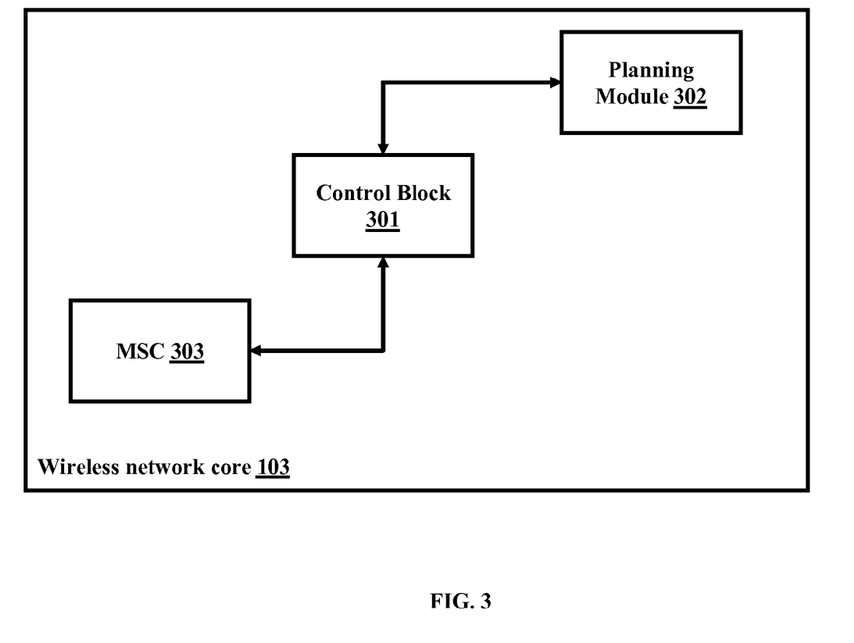
FIG. 3 depicts a wireless network core, according to embodiments as disclosed herein.

FIG. 3 depicts a wireless network core, according to embodiments disclosed herein. The wireless network core 103 comprises of a control block 301, a planning module 302 and a Mobile Switching Center (MSC) 303. The control block 301 controls the functioning of the modules within the wireless network core 103, including the planning module 302 and the MSC 303. The planning module 302 calculates the power consumption of the wireless network as a function of a plurality of parameters, where the parameters are based on the fundamentals of noisy channel communication, radio signal propagation and cellular base-station architecture. The planning module 302 further calculates the optimal cell radius in terms of power consumption, for a particular setting of the parameters like total user population, traffic variation over a period of time, fixed power consumption of BTS, type of service etc. The planning module 302 further obtains a set of radii which minimizes power consumption over the same traffic variation by considering all possible combinations of radii at each predefined intervals. In another embodiment herein, the search-space may be reduced by considering a discreet set of cell radii and maintaining an order among the candidate radii (lower level radii do not exceed higher level radii).

On receiving an indication from either the umbrella BTS 101 or any one of the subsidiary BTS 102, the control block 301 passes the indication to the planning module 302. The planning module 302 compares the energy consumption at that instant of time. The planning module 302 measures the energy consumption in terms of overall energy consumed, across all users, when the user(s) detected to move into the coverage area, is (are) served by the umbrella BTS 101 and overall energy consumed, across all users, when the subsidiary BTS 102 is turned ON and user(s) is(are) served by the subsidiary cell 102. The planning module 302 makes a comparison of the two energy consumption estimations and determines whether to perform appropriate actions on the subsidiary BTS 102. The actions to be performed on the subsidiary BTS 101 may to turn it ON or OFF. The planning module 302 informs the control block 301, which in turn informs the subsidiary BTS 102 to perform the appropriate action. Further, the control block 301 may also inform the umbrella BTS 101 to adapt the radius of the coverage area.

Figure 4:
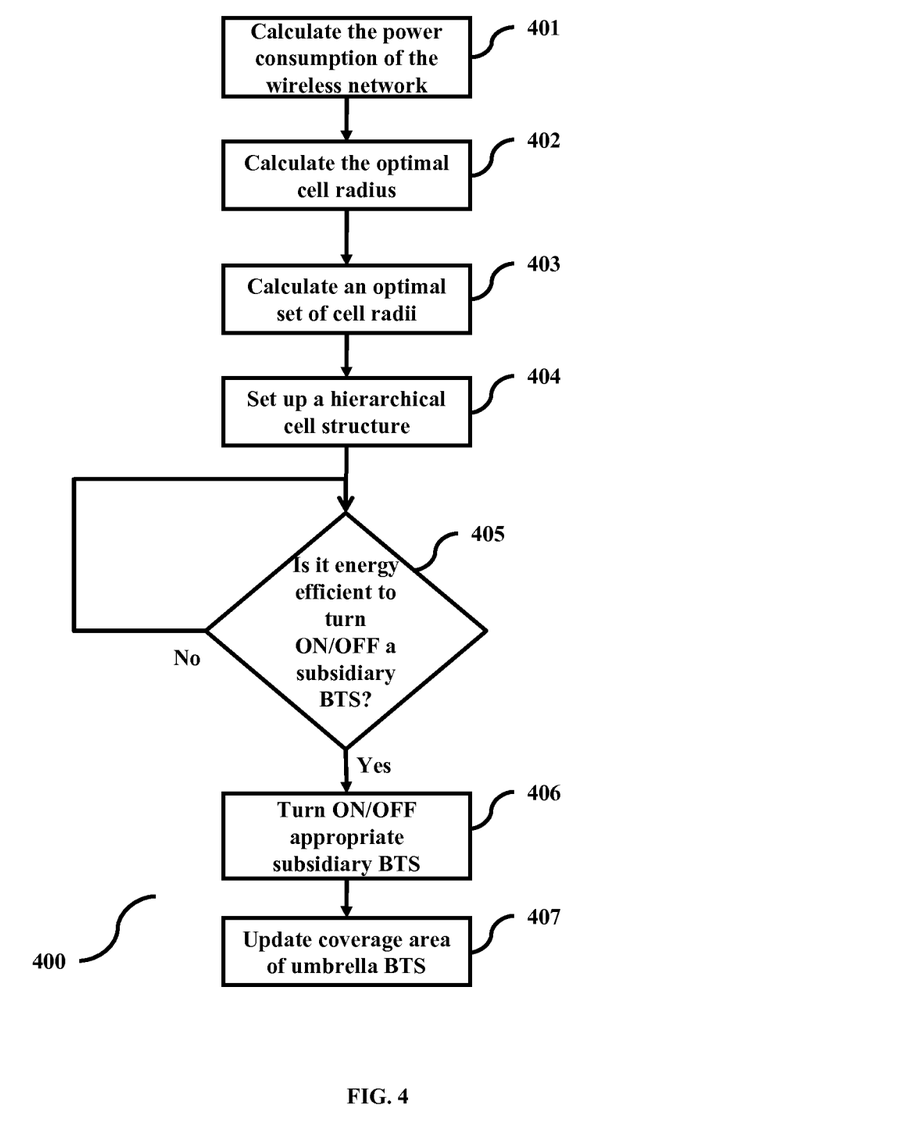
FIG. 4 depicts a flowchart, according to embodiments as disclosed herein.

FIG. 4 illustrates a flowchart, according to embodiments as disclosed herein. The wireless network core 103 calculates (401) the power consumption of the wireless network as a function of a plurality of parameters, where the parameters are based on the fundamentals of noisy channel communication, radio signal propagation and cellular base-station architecture. The wireless network core 103 further calculates (402) the optimal cell radius in terms of power consumption, for a particular setting of the parameters like total user population, traffic variation over a period of time, fixed power consumption of BTS, type of service etc. Consider that the network provides access over an area A with homogeneous cell size. Also, there are $N_u$ active users at a particular instance of time distributed among cells. Total number of cells in the network ($N_c$) and number of users per cell ($n_u$) can be calculated as per Table 1.

TABLE 1

|  | GSM900 | UMTS FDD | WiMAX |
|---|---|---|---|
| Downlink Freq. (MHz) | 935 | 2110 | 2300 |
| Channel B/W | 200 KHz | 5 MHz | 10 MHz |
| User bit rate | 13 kbps | 384 kbps | 5 Mbps |
| Channel code | LPC | Turbo | Turbo, LDPC |
| Area of cell of radius, d | Hexagonal, $(3\sqrt{3}/2) * d^2$ | | |
| Urban path loss model | COST 231 Walfisch-Ikegami | | |
| Urban fading values | Rayleigh 9 dB (0 for WiMAX); Shadow 5 dB, Indoor prop. 10 dB | | |
| BS power model | Antenna feeder loss 3 dB, Tx gain 10 dB, Power amplifier efficiency ~50% | | |

The parameters cell size, d and $n_u$ will determine power consumption of each BS ($P_{BS}$) and total network power consumption will be $P_{total}=P_{BS}*N_c$. This relation can be expressed by the equation, $$P_{total}=c_1+(c_2/d^2)+(c_3*d^e)$$

where value of $c_1$, $c_2$ and $c_3$ depend on various parameters used in the model and e is the associated path-loss exponent. Using the above claim, the optimal cell radius in terms of power for the entire network may be obtained. The optimal cell radius may further depend on locations of the base transceiver stations, density of the area (structural and human), topography of the area, presence of indoor users and any other factor which may affect the signal. The wireless network core 103 further obtains (403) a set of radii which minimizes power consumption over the same traffic variation by considering all possible combinations of radii at each predefined intervals. Based on the calculated optimal cell radii, the wireless network core creates (404) a hierarchical network cell structure. A check is made (405) if it would be energy efficient to turn ON/OFF the subsidiary BTS 102. The check may be done by checking the energy consumption at that instant of time and may be triggered to perform the check by an indication received from the umbrella BTS 101 or the subsidiary BTS 103. The energy consumption is measured in terms of overall energy consumed, across all users, when the user(s) in the coverage area of the subsidiary BTS 102 is (are) served by the umbrella BTS 101 and overall energy consumed, across all users, when user(s) in the coverage area of the subsidiary BTS 102 are served by the subsidiary BTS 102 and the coverage area of the umbrella BTS 101 is appropriately reduced. A comparison of the two energy consumption estimations is done and it is determined if appropriate actions need to be performed on the subsidiary BTS 102. If energy consumption will not be reduced by turning ON/OFF the subsidiary BTS 102, no action is done. If energy consumption will be reduced by turning ON/OFF the subsidiary BTS 102, the subsidiary BTS 102 is instructed (406) to perform the appropriate action. If it is detected that energy consumption would be reduced by turning OFF the subsidiary BTS 103, the subsidiary BTS 103 is instructed to turn OFF. If it is detected that energy consumption would be reduced by turning OFF the subsidiary BTS 103, the subsidiary BTS 103 is instructed to turn ON. Further, the umbrella BTS 101 may also adapt (407) the radius of the coverage area. The radius of the coverage area of the umbrella BTS 101 may be reduced, when the subsidiary BTS 102 is turned ON. The radius of the coverage area of the umbrella BTS 101 may be increased, when the subsidiary BTS 102 is turned OFF. In an embodiment herein, if the subsidiary BTS 102 is turned ON/OFF, then the coverage area of more than one umbrella BTS 101 may have to be appropriately changed. The various actions in method 400 may be performed in the order presented, in a different order or simultaneously. Further, in some embodiments, some actions listed in FIG. 4 may be omitted.

Figure 5:
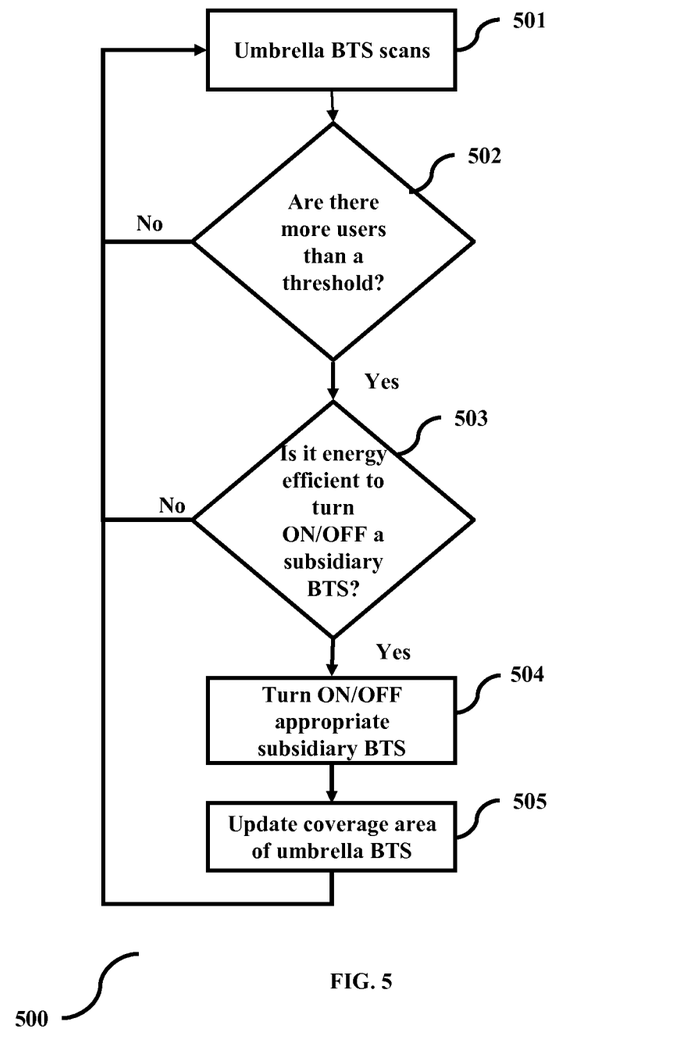
FIG. 5 illustrates a flowchart, according to embodiments as disclosed herein.

FIG. 5 illustrates a flowchart, according to embodiments as disclosed herein. The umbrella BTS 101 scans (501) the number of users present within its coverage area and their locations with respect to the location of the subsidiary BTSs 102. The locations of the users may be detected using the signal strength of the users (measured at the umbrella BTS 101, any known access node available to users or a plurality of subsidiary BTSs 102), triangulation or GPS. The umbrella BTS 101 checks (502) if there are more than a threshold number of users are present within the coverage area of the subsidiary BTS 102. If there are more than a threshold number of users, the umbrella BTS 101 compares the energy consumption at that instant of time. The umbrella BTS 101 checks (503) if the energy consumption may be reduced by turning the subsidiary BTS 102 ON/OFF. If the umbrella BTS 101 detects that energy consumption may be reduced by turning the subsidiary BTS 102 ON/OFF, then the umbrella BTS 101 informs the subsidiary BTS 101 of the same and turns (504) ON/OFF the subsidiary BTS 102. The umbrella BTS 101 may adjust (505) its coverage area accordingly. In an embodiment herein, if the subsidiary BTS 102 is turned ON/OFF, then the coverage area of more than one umbrella BTS 101 may have to be appropriately changed. The various actions in method 500 may be performed in the order presented, in a different order or simultaneously. Further, in some embodiments, some actions listed in FIG. 5 may be omitted.

Figure 6:
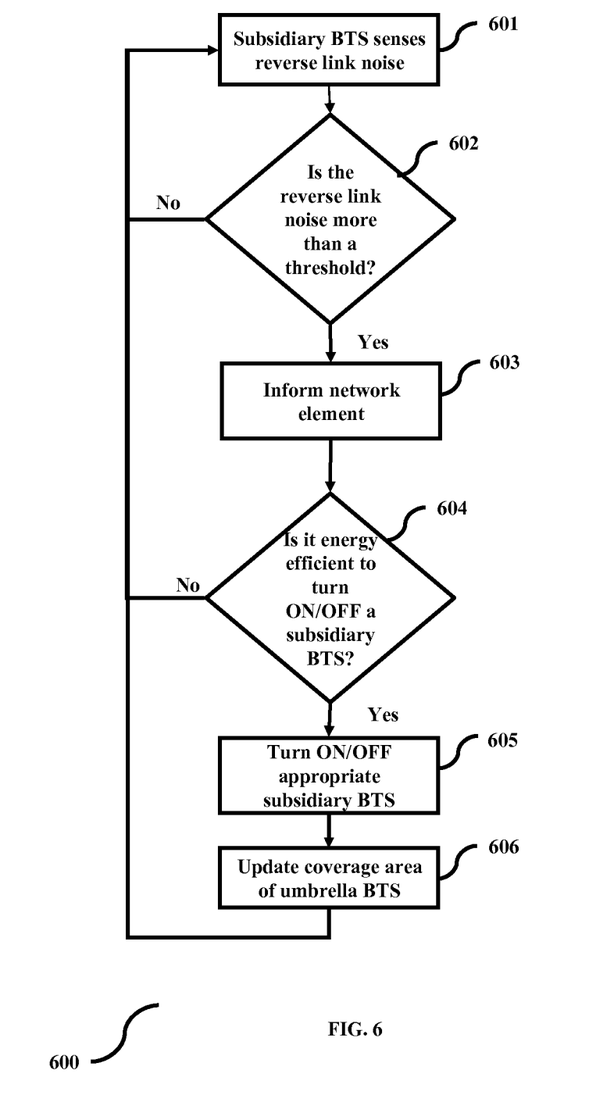
FIG. 6 illustrates a flowchart, according to embodiments as disclosed herein.

FIG. 6 illustrates a flowchart, according to embodiments as disclosed herein. The subsidiary BTS 102 senses (601) the received reverse link signal strength of users present within its coverage area. In an embodiment herein, the umbrella BTS 101 may inform the subsidiary BTS 103 of the channel to be scanned for the received reverse link signal strength. The subsidiary BTS 102 checks (602) if the received reverse link signal strength is greater than a threshold value. If the received reverse link signal strength is greater than the threshold value, the subsidiary BTS 102 informs (603) the network element, which may be the wireless network core 103 or the umbrella BTS 101. The network element compares the energy consumption at that instant of time. The network element checks (604) if the energy consumption may be reduced by turning the subsidiary BTS 102 ON/OFF. If the network element detects that energy consumption may be reduced by turning the subsidiary BTS 102 ON/OFF, then the network element informs the subsidiary BTS 101 of the same and turns (605) ON/OFF the subsidiary BTS 102. The umbrella BTS 101 may adjust (606) its coverage area accordingly. In an embodiment herein, if the subsidiary BTS 102 is turned ON/OFF, then the coverage area of more than one umbrella BTS 101 may have to be appropriately changed. The various actions in method 600 may be performed in the order presented, in a different order or simultaneously. Further, in some embodiments, some actions listed in FIG. 6 may be omitted.

Embodiments disclosed herein are agnostic of the base station technology, the air interface standard, and the type of traffic. Since the energy expense is large to keep a base station on even with some resources turned off, embodiments disclosed herein can save far more power by turning off entire base stations selectively The embodiments disclosed herein can be implemented through at least one software program running on at least one hardware device and performing network management functions to control the network elements. The network elements shown in FIGS. 1, 2 and 3 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method of selecting an optimal cell size in a wireless communication network comprising of a planning module and a plurality of base transceiver stations, said method comprising:

said planning module calculating power consumption of said wireless communication network as a function of a plurality of parameters, wherein the parameters are based at least on noisy channel communication, radio signal propagation, and cellular base station architecture;

said planning module calculating an optimal cell radius, wherein said optimal cell radius depends on at least one of users served by said wireless communication network;

traffic variation over a period of time in said wireless communication network;

power consumption of said Base Transceiver Stations; and types of service offered by said wireless communication network; and said planning module calculating a set of cell radii based on said optimal cell radius, wherein said cell radii minimizes power consumption over the same traffic variation in said wireless communication network.

2. The method, as claimed in claim 1, wherein said planning module calculates power consumption of said wireless communication network based on architecture of said wireless communication network.

3. The method, as claimed in claim 1, wherein said optimal cell radius minimizes power consumption of said wireless communication network over a period of time and depends at least on locations of said base transceiver stations, a density of an area, a topography of an area, and a presence of indoor users.

4. The method, as claimed in claim 1, wherein said set of cell radii is calculated by considering all possible combinations of said optimal cell radius at predefined intervals.

5. The method, as claimed in claim 1, wherein a cell structure is created in said wireless communication network based on said set of cell radii, wherein said cell structure comprises of at least one umbrella base transceiver station and a plurality of subsidiary base transceiver stations.

6. A wireless communication network comprising one or more processors configured to:

calculate power consumption of said wireless communication network as a function of a plurality of parameters, wherein the parameters are based at least on noisy channel communication, radio signal propagation, and cellular base station architecture;

calculate an optimal cell radius, wherein said optimal cell radius depends on at least one of users served by said wireless communication network;

traffic variation over a period of time in said wireless communication network;

power consumption of said Base Transceiver Stations; and types of service offered by said wireless communication network; and calculate a set of cell radii based on said optimal cell radius, wherein said cell radii minimizes power consumption over the same traffic variation in said wireless communication network.

7. The wireless communication network, as claimed in claim 6, where said one or more processors of said system are further configured to calculate power consumption of said wireless communication network based on architecture of said wireless communication network.

8. The wireless communication network, as claimed in claim 6, where said one or more processors of said system are further configured to calculate an optimal cell radius, wherein said optimal cell radius minimizes power consumption of said wireless communication network over a period of time and depends at least on locations of said base transceiver stations, a density of an area, a topography of an area, and a presence of indoor users.

9. The wireless communication network, as claimed in claim 6, where said one or more processors of said system are further configured to calculate said set of cell radii by considering a plurality of possible combinations of said optimal cell radius at predefined intervals.

* * * * *